Feb. 4, 1941.  P. W. KLIPSCH ET AL  2,230,803
WAVE SYNTHESIZING NETWORK
Filed Aug. 25, 1938    2 Sheets-Sheet 1
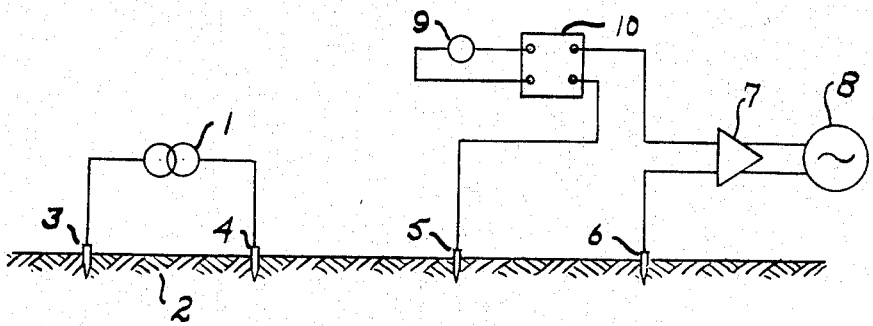
Fig.1.
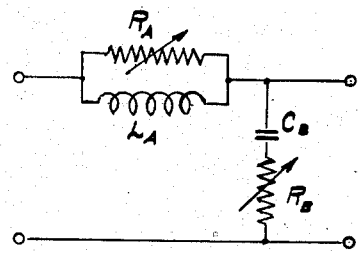  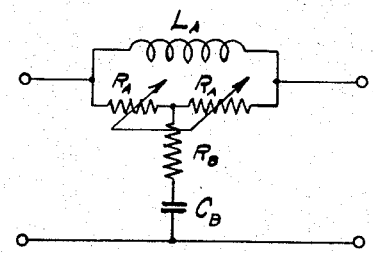
Fig.2.   Fig.3.
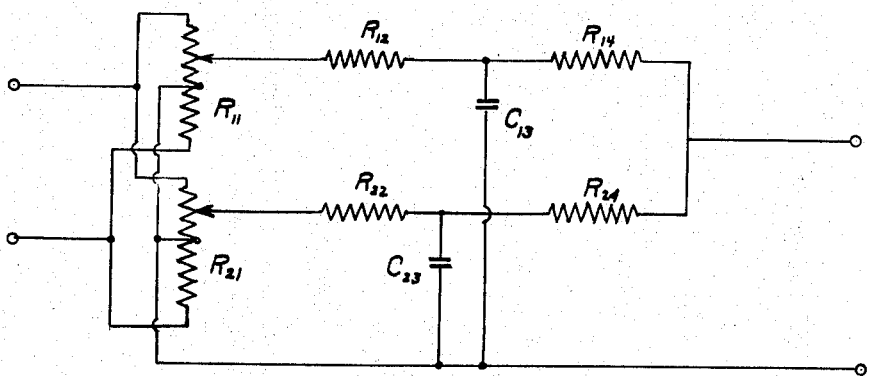
Fig.4.
Inventors
S. S. WEST
P. W. KLIPSCH
W. G. McLARRY
S. BILINSKY
By Jesse R. Stone
& Lister B. Clark
Attorneys Inventors
S. S. WEST
P. W. KLIPSCH
W. G. McLARRY
S. BILINSKY
By Jesse R. Stone
& Lester B. Clark
Attorneys Patented Feb. 4, 1941

2,230,803

UNITED STATES PATENT OFFICE 2,230,803

WAVE SYNTHESIZING NETWORK

Paul W. Klipsch, Samuel S. West, Solomon Bilinsky, and Weldon G. McLarry, Houston, Tex.

Application August 25, 1938, Serial No. 226,668

5 Claims. (Cl. 175—182)

This invention relates to electrical filter circuits and particularly those circuits which produce predetermined amounts of transient distortion. It also relates to the art of electrical prospecting for buried deposits in the earth's crust characterized by causing transient, intermittent, or periodic currents to flow in the earth, and noting the wave form distortion in the potential detected at a distance from the region where current is caused to flow.

In a copending application Serial No. 103,129 for Method of sub-surface prospecting there has been disclosed a method of geophysical exploration which depends upon observing the wave form distortion which results when an alternating current is caused to flow in the earth and the detected potential wave form is compared with the generated wave form. In an embodiment of that invention, alternating current, or a simple transient current as proposed by Blau in Patent No. 1,911,137, is caused to flow between two electrodes embedded in the earth's crust, and the resultant potential between two other electrodes is detected and its wave form compared to that of the current or the potential causing it.

As a means of comparison, a wave similar to the generated wave is distorted in a network, superimposed on the detected wave in phase opposition, and the amplitude and distortion varied until it compensates the detected wave, an oscillograph or oscilloscope giving a null indication when this compensation is complete. Then the constants of the distorting network serve directly or indirectly as a measure of the wave distortion. The various amounts and types of distortion are then indicative of the formations traversed by the current in the earth.

An object of the present invention is to provide distorting networks for geophysical prospecting by the above method such that wave forms produced by currents flowing in the earth can be duplicated in apparatus having known characteristics.

Another object is to provide circuits through which transient electric waves, or intermittent waves of predetermined wavefronts are transmitted with predetermined amounts of waveform distortion.

It is also an object to provide circuits whose performance in transmitting electric impulses can be varied such that the resultant wave form is similar to that observed in passing electric waves through the earth's crust.

Another object is to provide calibrating means for wave form analysers by providing means for producing wave forms of predetermined adjustable characteristics.

These and other objects will be evident from the following description taken in connection with the drawings in which:

Fig. 1 is a block diagram of the apparatus used.

Figs. 2, 3, and 4, are schematic diagrams of suitable distorting networks.

Figure 5A:
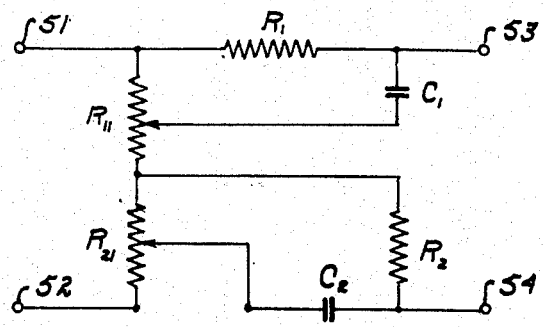
Fig. 5A is a convenient distorting network and Fig. 5B shows the response of the parts and of the whole network to a unit impulse.

Fig. 1 shows the general plan of an exploration method in which an electric generator 1 of suitable wave form causes current to flow in the earth 2 between electrodes 3 and 4. Spaced from the region of generation, detector electrodes 5 and 6 pick up a potential which is amplified in repeater 7 and the wave form of the potential exhibited on indicator 8 which may be a cathode ray or other oscillograph.

In order to measure the distortion produced in the wave form a null method is used. A second generator 9 generates a potential substantially similar in wave form to the current wave of generator 1. This potential which is of variable amplitude and which is substantially in synchronism with the current wave of the generator 1, is introduced into a wave distortion network 10 in which the wave shape may be selectively modified until it closely approximates the incoming wave. By adopting the correct polarity and adjusting the amplitude of the potential from the generator 9 the modified potential is caused to oppose the detected wave, and when the two wave shapes are similar the indicator shows a null.

In a form of the invention to be explained, generators 1 and 9 produce currents whose wave form is rectangular, so that they may be represented by Heaviside's unit function (see for example chapters IV and V, "Operational Circuit Analysis" by V. Bush, John Wiley & Sons, 1929). Obviously, the transient thus produced may be repeated intermittently or periodically.

The distorting network 10 in accordance with the invention may take on various forms as will be made more fully apparent.

In Fig. 2 there is shown a half-section which may be adjusted to different amounts of transient distortion.

Fig. 3 shows a bridged T suitable for the purpose of this invention. This circuit has the advantage that it constitutes a network of constant impedance so that its insertion would not affect other apparatus such as generators, amplifiers, or attenuators to which it is attached.

Fig. 4 shows a circuit in which two exponentials may be produced. That is, with a unit function input, the output voltage will be $$E = E_0(A_0 + A_1 \epsilon^{-a_1 t} + A_2 \epsilon^{-a_2 t}) \quad (1)$$

where $A_0$, $A_1$ and $A_2$ are adjusted by potential dividers $R_{11}$ and $R_{12}$, and time constants $a_1$ and $a_2$ are adjusted by varying $C_{13}$ and $C_{23}$ or $R_{12}$ and $R_{22}$. In order that Equation 1 be a close approximation, it is necessary that $$R_{14} \gg R_{12} \gg R_{11} \quad (2)$$
$$R_{24} \gg R_{22} \gg R_{21} \quad (3)$$

Obviously Equation 1 may be made to contain more terms by simply adding potentiometers and associated circuit elements which might be denoted $R_{31}$, $R_{32}$, $D_{33}$ etc.

Equation 1 may be said to define the indicial response of the circuit of Fig. 4. If Equation 1 expressed current in some branch of the circuit, it would define the transfer indicial admittance (see for example Bush, loc. cit. chap. IV.).

Figure 5B:
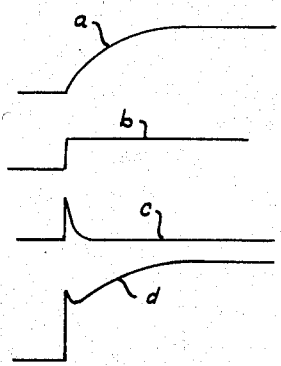

Fig. 5A shows another circuit and Fig. 5B shows typical indicial responses pertinent to each part of the circuit and the whole. Thus in Fig. 5B, $a$ shows the potential produced across $C_1$, $b$ shows the potential across the lower part of $R_{11}$, $c$ shows the potential across $R_2$, and $d$ shows the whole potential across the output terminals 53, 54.

Figure 6:
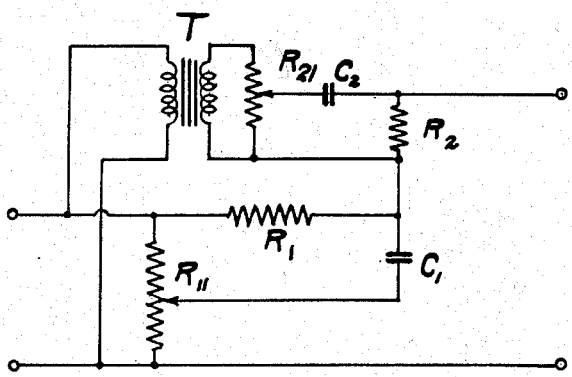
Fig. 6 is the equivalent in performance of Fig. 5A, differing therefrom in that both input and output circuits may be grounded.

The circuit of Fig. 6 is equivalent to that of Fig. 5 and has the advantage of being a 3-terminal network whose common terminal may be grounded for stability and to avoid otherwise uncontrollable capacitances to ground. The transformer T must have a leakage inductance whose reactance is small compared to the load across it at the highest frequencies to be transmitted. Also, the transformer T should have a shunt inductance which is sufficiently large, as compared with the impedances between which it is connected, so that its time-constant is long compared to the time constant of $R_2 \cdot C_2$. In this manner the requirements of this element of the network are readily met.

Figure 7A:
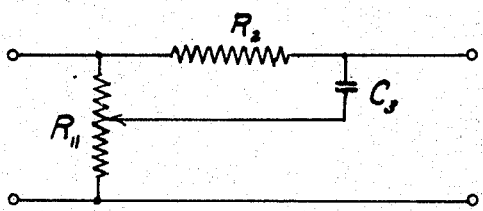
Figs. 7A and 7B show circuits which have similar responses and are therefore potentially equivalent.
Figure 7B:
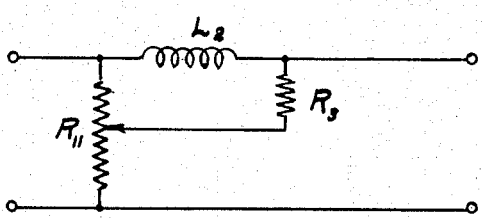

Figs. 7A and 7B illustrate the principle of equivalents. These two circuits are exactly equivalent if $$\frac{L_2}{R_3} = R_2 C_3 \quad (4)$$
$$R_2 \gg R_{11} \quad (5)$$
$$R_3 \gg R_{11} \quad (6)$$

In the practice of the invention the wave shape of the detected wave is caused to be nullified by the wave produced by the synthesizing circuit consisting of the generator 9 of Fig. 1 and one of the illustrated distorting networks which is adjusted until the null is produced. Then the wave shape may be defined in terms of the circuit constants such as the time constants or simply in terms of dial settings appropriate to given adjustments.

For an understanding of the operation of the invention, it has been explained on the assumption that the generators 1 and 9 produce step-like or unit function impulses. This is not necessary however; any wave form possessing frequency components (harmonics) over a sufficient range, say from 50 to 1000 cycles is suitable, provided that the wave forms of both generators are substantially similar. Regardless of the particular wave form used, when a balance or null is obtained the indicial response of the earth must be closely approximated by the indicial response of the network.

For simplicity in nomenclature a reactance-resistance combination such as $R_{12}$, $C_{13}$ in Fig. 4, $R_1$, $C_1$ in Fig. 6 or $L_2$, $R_3$ in Fig. 7B will be referred to as a time-constant circuit, the principal property of which is the time constant which is numerically determined by the $R \cdot C$ product or the $L/R$ ratio.

The invention claimed is:

1. Apparatus for electrical prospecting comprising means for causing current impulses to flow in the earth, means for indicating the wave form of a potential derived from said current, means for generating another wave form for the purpose of comparison with said potential wave form comprising an impulse generator, means for dividing the potential output of said generator into at least two portions, means for applying each of at least two of said portions to two different time-constant circuits of the reactance-resistance type, and means for taking off a voltage across the resistance of one of said time-constant circuits and a voltage across the reactance of another of said time-constant circuits, and combining them to form an output voltage for comparison purposes.

2. Apparatus for electrical prospecting comprising means for causing current impulses to flow in the earth, means for indicating the wave form of a potential derived from said current, means for generating another wave form produced for purposes of comparison with said potential wave form comprising an impulse generator and an electrical network between said generator and said indicating means including a plurality of time-constant circuits of the resistance-reactance type, means for applying at least part of the voltage output to said generator across each of said time-constant circuits, means for taking off a voltage across a reactance of one of said time-constant circuits, means for taking off a voltage across a resistance of at least another of said time-constant circuits, means for passing at least part of the voltage output of said generator through said network unaltered, and means for combining this unaltered voltage with the aforesaid voltages taken off the time-constant circuits and applying the combination to the indicating means.

3. Apparatus for electrical prospecting comprising means for causing current impulses to flow in the earth, means for indicating the wave form of a potential derived from said constant, means for generating another wave form for purposes of comparison with said potential wave form including a generator of a wave form suitable for comparison with said potential wave form after suitable modification, a resistance arranged across the output of said generator, at least two different time-constant circuits connected across different portions of said resistance, the total impedance of each of said time-constant circuits being as large compared to the value of the portion with the resistances across which it is connected, means for taking off a voltage across a reactance of one of said time-constant circuits, means for taking off a voltage across a resistance of another of said time-constant circuits, and means for combining these voltages and applying them to the indicating means.

4. An apparatus according to the preceding claim in which the time-constant circuits are so connected to the resistance that the steady state value of the voltage fed from said network to the indicator will always be the same regardless of the size of the portion of the resistance which is included in the respective time-constant circuits.

5. A circuit for generating a wave form of predetermined shape comprising a generator of a wave form of selected, preferably rectangular, shape, means for dividing the potential output of said generator into at least two portions, means for applying each of at least two of said portions to two different time-constant circuits of the reactance-resistance type, means for taking off a voltage across the resistance of one of said time-constant circuits and a voltage across the reactance of another of said time-constant circuits, and combining them.

SAMUEL S. WEST.
PAUL W. KLIPSCH.
WELDON G. McLARRY.
SOLOMON BILINSKY.